United States Patent [19]

Aoyama et al.

[11] Patent Number: 5,721,307
[45] Date of Patent: Feb. 24, 1998

[54] METHOD OF MANUFACTURING MIXTURES OF POLYDIORGANOSILOXANES AND FINELY POWDERED SILICA

[75] Inventors: Takaki Aoyama; Toyohiko Yamadera, both of Chiba Prefecture, Japan

[73] Assignee: Dow Corning Toray Silicone Co., Ltd., Tokyo, Japan

[21] Appl. No.: 734,985

[22] Filed: Oct. 22, 1996

[30] Foreign Application Priority Data

Nov. 30, 1995 [JP] Japan .................... 7-336079

[51] Int. Cl.$^6$ ........................................ C08K 3/34
[52] U.S. Cl. ................... 524/493; 524/588; 524/789; 524/860; 264/211.12; 264/211.24; 264/211
[58] Field of Search ..................... 524/493, 588, 524/489, 860; 464/211.12, 211.24, 211

[56] References Cited

U.S. PATENT DOCUMENTS

| | | | |
|---|---|---|---|
| 5,227,111 | 7/1993 | Brangers et al. | 524/860 |
| 5,531,923 | 7/1996 | LeBlanc et al. | 524/860 |

FOREIGN PATENT DOCUMENTS 07-037062  3/1995  Japan.

OTHER PUBLICATIONS

Encyclopedia of Polymer Science and Engineering, vol. 13, p. 316 (1988); vol. 15, pp. 204–207 (1989).

*Primary Examiner*—Melvyn I. Marquis
*Attorney, Agent, or Firm*—William F. Boley

[57] ABSTRACT

A method for the preparation of a silicone rubber composition, a liquid polydiorganosiloxane (A), finely powdered silica (B), liquid polyorganosiloxane (C) and water (D) are introduced continuously into the raw material inlet of a biaxial continuous extruding and mixing machine. In the present method the liquid polydiorganosiloxane is introduced into the raw material inlet through the outer lumen of a double lumen tube and the finely powdered silica is introduced into the raw material inlet through the inner lumen of the double lumen tube. As a result, the finely powdered silica can be introduced rapidly without being scattered to the surrounding area and superior mixing of the two substances is achieved.

12 Claims, 2 Drawing Sheets

METHOD OF MANUFACTURING MIXTURES OF POLYDIORGANOSILOXANES AND FINELY POWDERED SILICA

BACKGROUND OF INVENTION

This invention relates to a method of continuous manufacture of mixtures of polydiorganosiloxanes and finely powdered silica. Mixtures of polydiorganosiloxanes and finely powdered silica are widely used as silicone rubber bases, defoaming agents, and greases.

Polydiorganosiloxanes are hydrophobic and finely powdered silica is hydrophilic, for which reason they are difficult to mix. To facilitate mixing, the finely powdered silica is typically treated with a hydrolyzable hexaorganodisiloxane in the presence of water. A method of mixing in a trough mixer is extremely common for mixing polydiorganosiloxanes and finely powdered silica. Most recently, a mixing method has been proposed in which a liquid polydiorganosiloxane, finely powdered silica, a hexaorganodisiloxane, and water are continuously introduced from four or more different ports in a biaxial continuous extruding and mixing machine. (Japanese Patent However, finely powdered silica such as fumed silica and silica obtained by the precipitation method is of extremely low bulk density and readily tends to be scattered. For this reason, there is the problem that it is not easy to introduce it rapidly into the raw material inlet of a biaxial continuous extruding and mixing machine without its being scattered into the surrounding area and there is also the problem that mixing efficiency is poor.

For these reasons, the inventors conducted intensive research for the purpose of solving these problems. As a result, they perfected this invention by discovering that when a liquid polydiorganosiloxane is introduced into the raw material inlet of a biaxial continuous extruding and mixing machine through the outer lumen of a double lumen tube and finely powdered silica filler is introduced into the raw material inlet of a biaxial continuous extruding and mixing machine through the inner lumen of a double lumen tube, the finely powdered silica can be introduced rapidly without scattering into the surrounding area and the two can be easily mixed. The objective of this invention is to make it possible to introduce finely powdered silica rapidly into a biaxial continuous extruding and mixing machine without it being scattered to the surrounding area and to facilitate mixing of the polydiorganosiloxane and finely powdered silica when mixtures of the two substances are being continuously manufactured.

SUMMARY OF INVENTION

In this invention for the preparation of a silicone rubber composition, a liquid polydiorganosiloxane (A), finely powdered silica (B), liquid polyorganosilazane (C), and water (D) are introduced continuously into the raw material inlet of a biaxial continuous extruding and mixing machine. In the present method the liquid polydiorganosiloxane is introduced into the raw material inlet through the outer lumen of a double lumen tube and the finely powdered silica is introduced into the raw material inlet through the inner lumen of the double lumen tube. As a result, the finely powdered silica can be introduced rapidly without being scattered to the surrounding area and superior mixing of the two substances is achieved.

Figure 1:
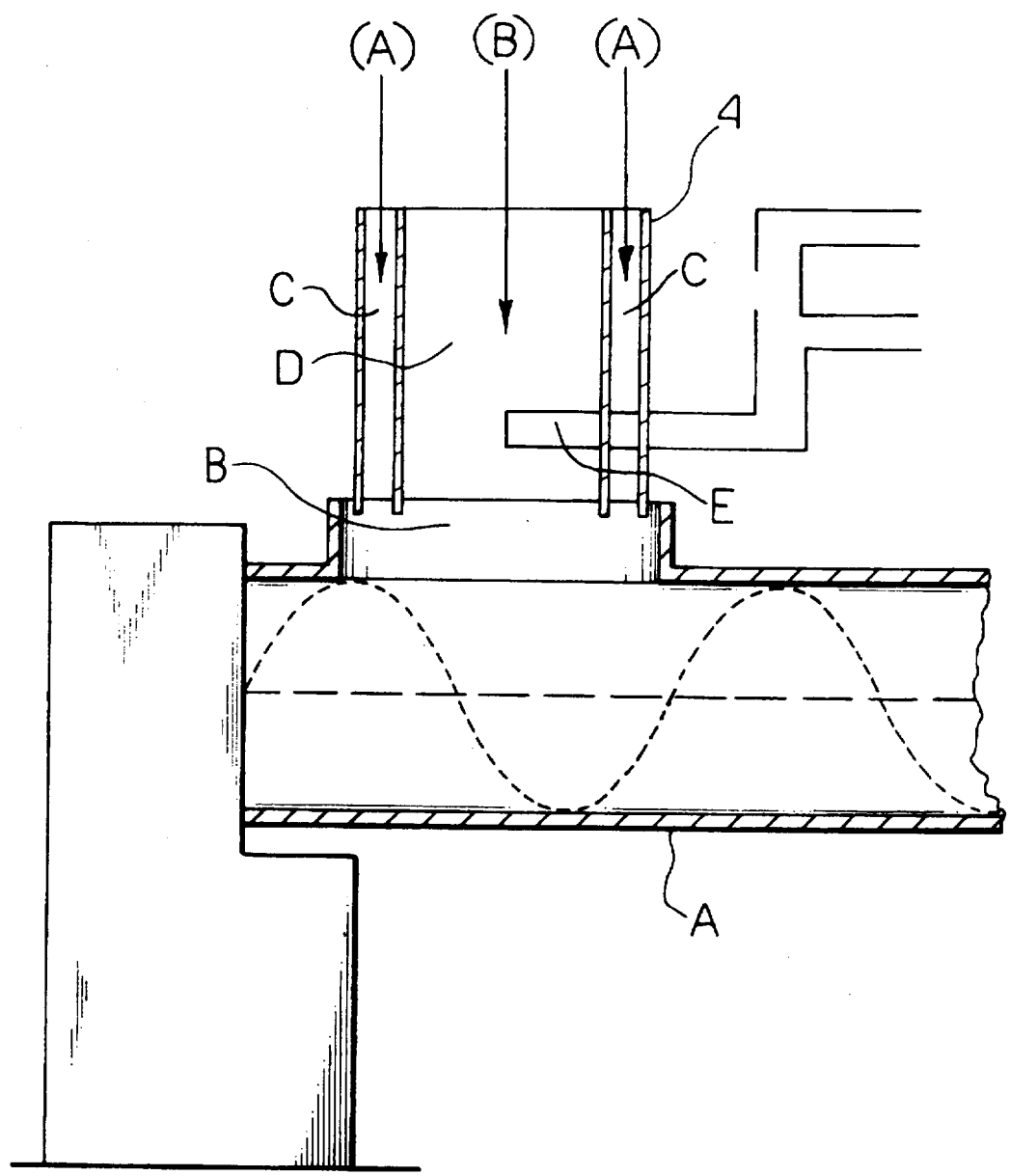
FIG. 1 is a schematic cross-sectional view of the region surrounding the raw material inlet of the biaxial continuous extruding and mixing machine used in the examples of this invention.

A biaxial continuous extruding and mixing machine
B raw material inlet
C outer lumen
D inner lumen
E piping
1 barrel
2 screw
3 drive component
4 double lumen tube
5 inlet
6 discharge outlet
7 continuous supply device
8 storage tank
9 pump
10 branch valve
11 storage tank
12 storage tank
13 pump
14 pump
15 transfer component of biaxial continuous extruding and mixing machine
16 Upstream side kneading component of biaxial continuous extruding and mixing machine
17 Downstream side mixing component of biaxial continuous extruding and mixing machine
18 electric heater
19 electric heater
20 pressure regulating valve
21 vent outlet
22 vent outlet
23 condenser
24 vacuum pump

DESCRIPTION OF INVENTION

The objective of the present invention is to provide a method of manufacturing mixtures of polydiorganosiloxanes and finely powdered silica. The method comprises introducing (A) a liquid polydiorganosiloxane, (B) finely powdered silica, (C) a liquid polyorganosilazane and (D) water into the raw material inlet of a biaxial continuous extruding and mixing machine, where component (A) is introduced through the outer lumen of a double lumen tube and component (B) is introduced through the inner lumen of the double lumen tube.

A representative biaxial continuous extruding and mixing machine that can be used in this invention is a device in which two rotating screws that rotate in synchronization in the same or different directions are arranged in parallel in a barrel. The raw material inlet is installed in the base in the lengthwise direction so that its opening faces upwards and the double lumen tube for introducing the liquid polydiorganosiloxane is installed in the raw material inlet. The outer lumen of the double lumen tube is used for introducing the liquid polydiorganosiloxane and the inner lumen of the double lumen tube is used for introducing the finely powdered silica.

The liquid polydiorganosiloxane should be in a liquid state when it is introduced. Consequently, when it is in the form of a raw rubber at normal temperature, it should be preheated to a liquid state, in which case the outer lumen of the double lumen tube should be heated from the outside.

The inside diameters and lengths of the outer lumen and inner lumen of the double lumen tube should be set appropriately in accordance with the viscosity of the liquid polydiorganosiloxane, the bulk density of the finely powdered silica, and the compounding ratio of the two substances.

The polyorganosilazane and the water may both be introduced into the raw material inlet. Both substances may be introduced through one tube after having been mixed in advance or they may be introduced through separate tubes. In either case, the tip of the tube should open into the inner lumen of the double lumen tube. When this is done, the polyorganosiloxane and the water directly strike or come into contact with the finely powdered silica and increase the efficiency of the hydrophobic treatment.

The outlet for the mixed material is on the opposite side of the base in the lengthwise direction of the barrel. A wire netting for filtering foreign matter should be installed outside the outlet.

The mixing component is in the region between the base of the barrel and the outlet. An inlet for the adding of additional liquid polydiorganosiloxane through which the liquid polydiorganosiloxane may also be installed here.

The mixing screw may be of the 1-screw, 2-screw or 3-screw type and may be engaging type screws that engage with each other or they may be non-engaging type screws that do not engage with each other.

The L/D ratio of the screw should be 20 to 50, and, preferably, 35 to 50. Here, L indicates the length of the screw and D indicates the diameter of the screw. The peripheral velocity of the screw should be 0.2 to 1.7 m/s, and, preferably, 0.5 to 1.5 m/s.

The polydiorganosiloxanes that are used in this invention may be in liquid form when they are introduced into the raw material inlet or they may be in the form of raw rubber at normal temperature and become liquid when heated. Therefore, they may be preheated to form a liquid or the outer lumen of the double lumen tube can be heated to make them liquid.

The polydiorganosiloxane may be a straight chain, a straight chain with some branches, or cyclic. When they are for silicone rubber, it is preferable that they be a straight chain.

Examples of the organic groups that are bonded with the silicon atoms of the polydiorganosiloxane can include alkyl groups such as methyl, ethyl, propyl, and butyl; alkenyl groups such as vinyl, allyl, and 1-propenyl; substituted alkyl groups such as 2-phenylmethyl, 2-phenylethyl, and 3,3,3-trifluoropropyl; and aryl groups such as phenyl and tolyl. The aforementioned organic groups and hydroxyl groups are examples of groups that can be bonded to the terminal silicon atoms of the polymer chains.

When the liquid polydiorganosiloxane is for formation of an addition reaction type silicone rubber, it is necessary to have two or more silicon atom bonded alkenyl groups, for example, vinyl groups, in 1 molecule.

The viscosity of the liquid polydiorganosiloxane when it is introduced should be 0.3 Pa.s to 50 Pa.s at 25° C. from the standpoint of miscibility.

The finely powdered silica that is used in this invention is a reinforced silica filler having a specific surface area greater than 40 m²/g, and, generally, of 50 m²/g to 300 m²/g, from the standpoint of displaying the scattering inhibiting effect of this invention. Fumed silica of a specific surface area greater than 100 m²/g is preferred.

The polyorganosilazane that is used in this invention is a liquid compound at ordinary temperature and pressure, i.e., at a temperature of 25° C. and a mercury pressure of 760 mmHg. The polyorganosilazane can be represented by general formula $(R^1{}_3Si(OSiR^2R^3)_a)_2NH$, where, $R^1$, $R^2$ and $R^3$ are monovalent hydrocarbon groups which may be the same or different, and a is an integer of 0 to 50. From the standpoint of treatment efficiency, hexaorganodisilazanes such as hexamethyldisilazane and tetramethyldivinyldisilazane are desirable when a is 0. The polyorganosiloxane is hydrolyzed and bonds with the finely powdered silica when it comes into contact with water, acting to make the silica hydrophobic.

The compounding ratios of the aforementioned components may be set in accordance with the desired properties of the mixed material and there are no particular limitations on them. From the standpoint of mixability, 5 to 80 parts by weight of component (B) may be compounded per 100 parts by weight of component (A); the quantity of component (C) may be set in accordance with the quantity of component (B), its specific surface area and its silanol group content; and the quantity of component (D) may be greater than the quantity sufficient to hydrolyze component (C). In general, the quantity of component (C) should be 0.75 to 20 parts by weight per 100 parts of component (A) and the quantity of component (D) should be 0.1 to 8 parts by weight per 100 parts of component (A).

FIG. 1 shows a representative example of the method of introducing the components that are used in this invention. The liquid polydiorganosiloxane (A) is introduced through outer lumen C of double lumen tube 4 into raw material inlet B of biaxial continuous extruding and mixing machine A. Finely powdered silica (B) is introduced through inner lumen D of double lumen tube 4 into raw material inlet B of biaxial continuous extruding and mixing machine A. Polyorganosilazane (C) and water (D) may be mixed in advance and introduced through single pipe E into raw material inlet B of biaxial continuous extruding and mixing machine A or they may be supplied through separate pipes to raw material inlet B of biaxial continuous extruding and mixing machine A. In either case, from the standpoint of treatment effectiveness, it is desirable that they pass through inner lumen D of double lumen tube 4 so that they directly strike or come into contact with the finely powdered silica that is supplied.

Next, we shall describe this invention by means of examples. The biaxial continuous extruding and mixing machine A that was used in the examples had a screw diameter of 72 mm, an L/D ratio of 47 and a screw rotation speed of 500 rotations per minute.

Examples. The components indicated below were supplied continuously in the weight ratios indicated below to biaxial continuous extruding and mixing machine A as described in the Figures herein:

(A) 100 parts by weight of polydimethylsiloxane having a viscosity of 10 Pa.s at 25° C. having both terminals blocked with dimethylvinylsiloxy groups (vinyl group content of 0.135 wt %)

Figure 2:
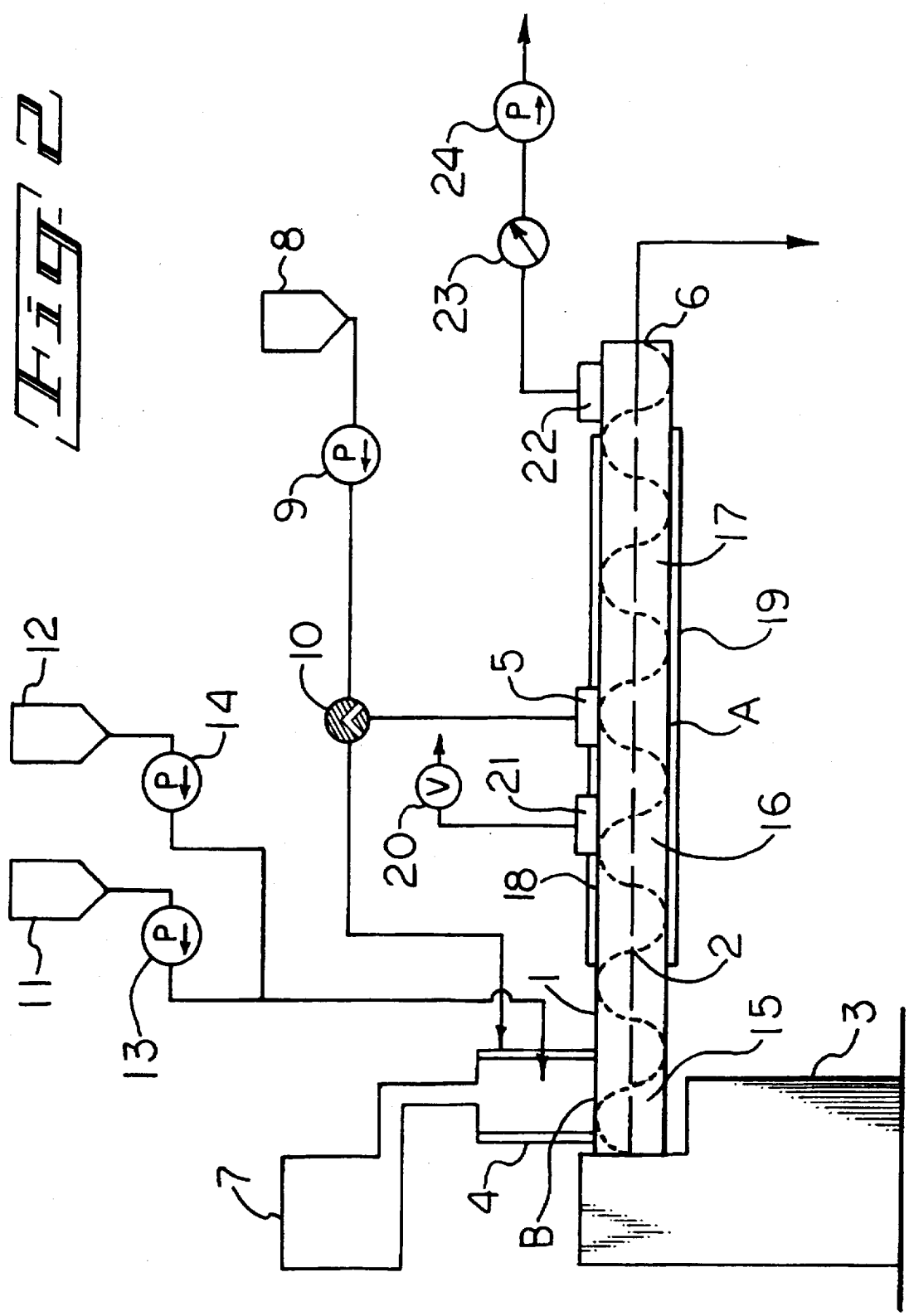
FIG. 2 is a schematic cross-sectional view of the biaxial continuous extruding and mixing machine used in the examples of this invention and of its accessory equipment.

(B) 45 parts by weight of fumed silica having a specific surface area of 200 m²/g (C) 10.3 parts by weight of hexamethyldisilazane (D) 2.6 parts by weight of water In FIG. 2, 1 is the barrel in which screw 2 having 2 screws is installed in parallel. The two screws comprising screw 2 are rotated in synchronization in the same direction by drive component 3. Double lumen tube 4 for the purpose of introducing the polydimethylsiloxane and the fumed silica is installed at the raw material inlet B at the base of barrel 1, inlet 5 for the purpose of introducing additional polydimethylsiloxane is installed at the center of barrel 1 and discharge outlet 6 for the purpose of discharging the mixed material is installed at the end of barrel 1. Continuous supply device 7 is for the purpose of continuously supplying fumed silica, which is a powder that is easily scattered, to inner lumen D of double lumen tube 4. Continuous supply device 7 may be in the form of a belt or screw.

Component 8 is the storage tank for the liquid polydimethylsiloxane. The polydimethylsiloxane in storage tank 8 is suctioned by pump 9 inside the pipe and is fed at a constant ratio by branch valve 10, with 80 percent of it being supplied to the outer lumen C of double lumen tube 4 and the remaining 20 percent supplied to inlet 5.

Component 11 is the storage tank for the water and component 12 is the storage tank for hexamethyldisilazane. The liquid raw materials in storage tanks 11 and 12 are suctioned through the pipes by the respective pumps 13 and 14 and merge in the course of their flow. They then pass through the side of double lumen tube 4 and are introduced so that they strike the finely powdered silica that is passing through inner lumen D of double lumen tube 4. At this point, the hexamethyldisilazane and the water may be passed separately through the piping and be introduced into inner lumen D of double lumen tube 4.

The transfer component 15, which primarily transfers the introduced raw materials, is located on the upstream side of screw 2 which is connected to raw material inlet B and mixing components 16 and 17, which primarily effect mixing, are connected to transfer component 15. Electric heaters 18 and 19 are installed, respectively, in the mixing components 16 and 17 so as to heat mixing components 16 and 17 to 100° to 300° C. Open vent outlet 21, the pressure of which is adjusted to a fixed pressure by pressure regulation valve 20, is installed at the posterior end of kneading component 16 on the upstream side and the vent outlet 22 is installed at the posterior end of mixing component 17 on the downstream side. The latter vent outlet 22 is connected to vacuum pump 24 via condenser 23 and the volatile components in the barrel (for example, ammonia that is produced by hydrolysis of hexamethyldisilazane) is discharged to the outside by means of vacuum pump 24.

The L/D ratio of raw material inlet B was 1 to 6, the L/D ratio of inlet 5 was 23 to 26, the L/D ratio of open vent outlet 21 was 20 to 22, the L/D ratio of vent outlet 22 was 40 to 43 and the L/D ratio of discharge outlet 6 was 47.

Initially cooling was effected and the temperature of the biaxial continuous extruding and mixing machine was maintained below 50° C. The L/D ratio in barrel 1 was set from 13 to an L/D ratio of 47 and the temperature was raised continuously. As condition 1, the temperature was raised from 80° C. to 280° C. As condition 2, the temperature was raised from 50° C. to 280° C. As condition 3, the temperature was raised from 50° C. to 200° C.

The average retention time of the various raw materials introduced through raw material inlet B in the biaxial continuous extruding and mixing machine A was 90 seconds. Table 1 shows the findings for determination of the viscosities of liquid silicone rubber bases manufactured under the three conditions described above and of liquid silicone rubber bases manufactured by heating and mixing the same raw materials at the same compounding ratios using a conventional, known trough mixer. When the viscosity of samples treated under condition 3 was determined after storage at room temperature for 1.5 months, it was determined to be 12.4 Pa.s at 25° C., with essentially no thickening occurring. In addition, amounts of 0.83 parts by weight of polymethylhydrogensiloxane (viscosity, 0.01 Pa.s) both terminals of which were blocked by trimethylsiloxy groups as a crosslinking agent, 0.000275 parts by weight of a complex of chloroplatinic acid and tetramethyldivinyldisilazane as a curing catalyst, and 0.014 parts by weight of 3,5-dimethyl-1-hexen-3-ol as a cure inhibitor were added to 100 parts by weight of liquid silicone rubber base manufactured under these three conditions and to 100 parts by weight of a liquid silicone rubber base manufactured by heating and mixing the same raw materials at the same compounding ratios using a conventional, known trough mixer and the materials were mixed until they were uniform. The materials were then heated and cured to form sheets. The curing conditions were 150° C. for 10 minutes under pressure. Table 1 shows the results of determinations of the physical properties of the sheet-shaped silicone rubber. Initial viscosity was determined by introducing the liquid silicone rubber base under pressure into a cylinder for viscosity determination after it had been mixed in a table model mixer, pressing down the plunger, and determining the weight of the beads that were discharged from the nozzle within a specified time. Apparent viscosity was then calculated by the Hagen-Poiseuille equation.

Viscosities after the materials had been allowed to stand for 1.5 months were determined and calculated under the same conditions as described above.

TABLE 1

|  | Condition | | | Trough |
|---|---|---|---|---|
|  | 1 | 2 | 3 | Mixer |
| Durometer | 43 | 42 | 40 | 45 |
| Viscosity, Pa · s | 15.6 | 14.8 | 9.7 | 28 |
| Elongation (%) | 610 | 620 | 650 | 640 |
| Tensile, kg/cm$^2$ | 95 | 97 | 80 | 100 |
| Tear, kg/cm | 22 | 27 | 25 | 21 |

We claim:

1. A method of manufacturing mixtures of polydiorganosiloxanes and finely powdered silica comprising continuously introducing (A) a liquid polydiorganosiloxane,
   (B) a finely powdered silica having a specific surface area of greater than 40 m$^2$/g,
   (C) a liquid polyorganosilazane of the formula (R$^1$Si(OSi R$^2$R$^3$)$_a$)$_2$NH, where R$^1$, R$^2$, and R$^3$ are monovalent hydrocarbon groups which may be the same or different, and a is an integer of 0 to 50, and
   (D) water into a raw material inlet of a biaxial continuous extruding and mixing machine, where component (A) is introduced into the raw material inlet though an outer lumen of a double lumen tube and component (B) is introduced though an inner lumen of the double lumen tube, and continuously mixing and extruding the mixture through the machine.

2. A method of manufacturing mixtures of polydiorganosiloxanes and finely powdered silica, according to claim 1, where component (A) is a liquid polydiorganosiloxane that has two or more silicon-atom-bonded alkyl groups in 1 molecule and (C) is a hexaorganodisilazane.

3. A method of manufacturing mixtures of polydiorganosiloxanes and finely powdered silica according to claim 1, where the mixture is mixed at a temperature of 50° to 300° C.

4. A method of manufacturing mixtures of polydiorganosiloxanes and finely powdered silica according to claim 2, where the mixture is mixed at a temperature of 50° to 300° C.

5. A method of manufacturing mixtures of polydiorganosiloxanes and finely powdered silica according to claim 1, where a mixture of the polyorganosiloxane and water is introduced into the inner lumen of the double lumen tube.

6. A method of manufacturing mixtures of polydiorganosiloxanes and finely powdered silica according to claim 1, where the biaxial continuous extruding and mixing machine comprises a screw having a length to diameter ratio of 35 to 50 and the peripheral velocity of the screw is 0.5 to 1.5 meter per second.

7. A method of manufacturing mixtures of polydiorganosiloxanes and finely powdered silica according to claim 1, where the polydiorganosiloxane is a linear chain.

8. A method of manufacturing mixtures of polydiorganosiloxanes and finely powdered silica according to claim 1, where the polydiorganosiloxane is a dimethylvinylsiloxy end-blocked polydimethylsiloxane having a viscosity of 0.3 Pa.s to 50 Pa.s at 25° C.

9. A method of manufacturing mixtures of polydiorganosiloxanes and finely powdered silica according to claim 1, where the specific surface area of the finely powdered silica is 50 $m^2/g$ to 300 $m^2/g$.

10. A method of manufacturing mixtures of polydiorganosiloxanes and finely powdered silica according to claim 1, where the polyorganosilazane is selected from a group consisting of hexamethyldisilazane and tetramethyldivinyldisilazane.

11. A method of manufacturing mixtures of polydiorganosiloxanes and finely powdered silica according to claim 1 comprising the introduction into the biaxial continuous extruding and mixing machine of (A) 100 parts by weight of the polydiorganosiloxane, (B) 5 to 80 parts by weight of the finely powdered silica, (c) 0.75 to 20 parts by weight of the polyorganosiloxane, and (D) 0.1 to 8 parts by weight of water.

12. A method of manufacturing mixtures of polydiorganosiloxanes and finely powdered silica according to claim 11, where the polydiorganosiloxane is a dimethylvinylsiloxy end-blocked polydimethylsiloxane having a viscosity of 0.3 Pa.s to 50 Pa.s at 25° C., the finely powdered silica is a precipitated silica having a specific surface area of 50 $m^2/g$ to 300 $m^2/g$, and the polyorganosilazane is selected from a group consisting of hexamethyldisilazane and tetramethyldivinyldisilazane.

* * * * *